Figures 1, 2:
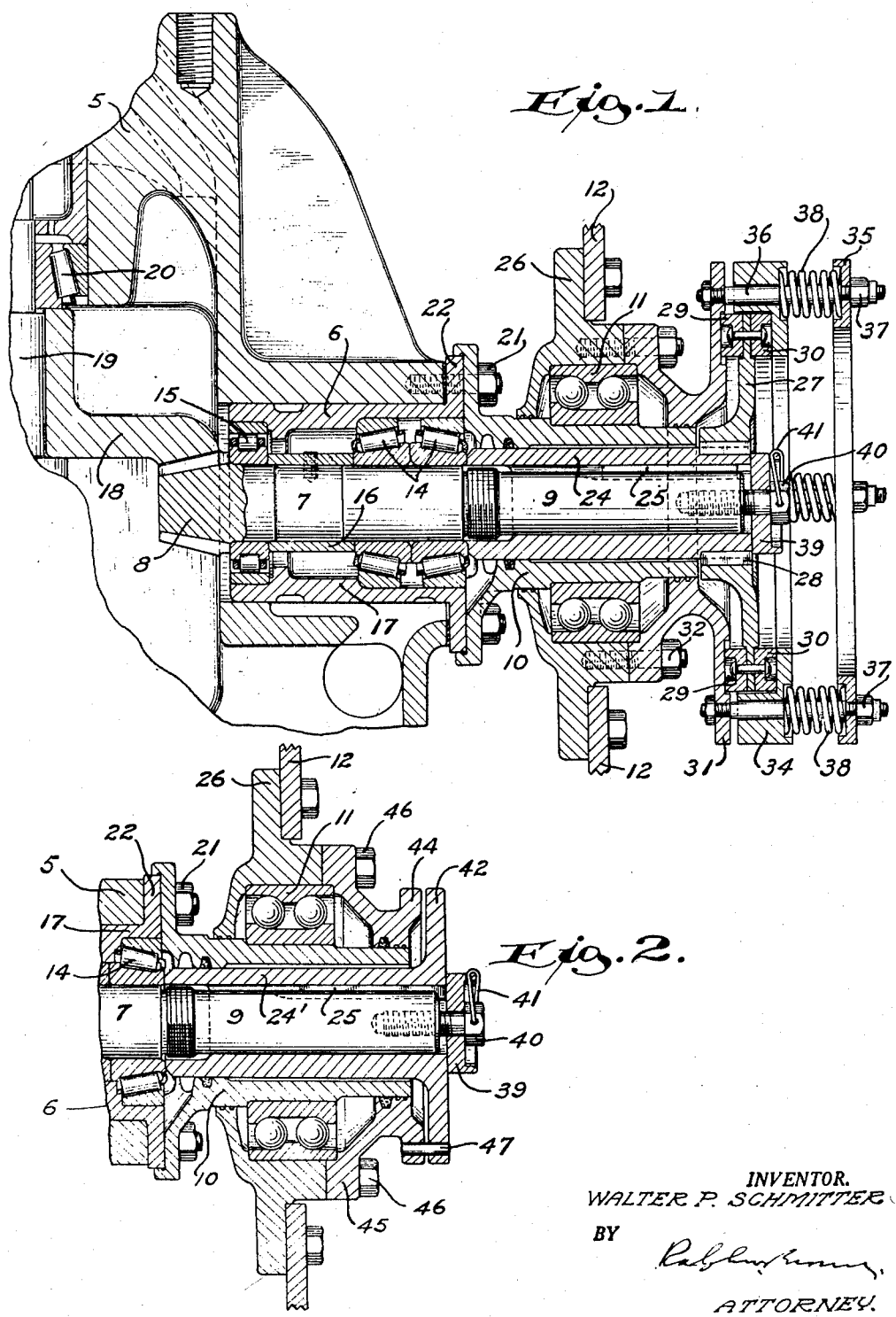

Feb. 6, 1951    W. P. SCHMITTER    2,540,997
POWER TRANSMISSION MECHANISM
Filed March 2, 1948

INVENTOR.
WALTER P. SCHMITTER
BY
ATTORNEY.

Patented Feb. 6, 1951

2,540,997

UNITED STATES PATENT OFFICE 2,540,997

POWER TRANSMISSION MECHANISM

Walter P. Schmitter, Wauwatosa, Wis., assignor to The Falk Corporation, Milwaukee, Wis., a corporation of Wisconsin Application March 2, 1948, Serial No. 12,642

2 Claims. (Cl. 64—1)

The present invention relates in general to improvements in motion or power transmitting mechanisms, and relates more specifically to improvements in the construction and operation of overhung rotary power transmissions.

It has long been common practice in the art of rotary motion or power transmission, to transmit the motion from a driving member to a driven member through a rotary element such as a bearing supported shaft, and to provide a clutch or other type of releasable connection for relieving the shaft from excessive torque under overload operating conditions. In most of these prior transmissions, the driving member such as a pulley or gear was ordinarily mounted directly upon one overhanging end of the motion transfer shaft while the overload releasable connection was interposed between the driver and this overhung shaft end; and while this arrangement of elements was quite satisfactory for small installations involving limited power or load transmission, the overhung driving member supported only by the overhanging shaft end would subject the shaft bearing to excessive wear whenever extreme lateral pressure was applied to the driver. In order to overcome this objection in larger power transmissions, it was usual practice to provide an additional bearing for the motion transfer shaft, outwardly beyond the driving member and the releasable connection; but this assemblage of elements while obviating the difficulties encountered with the overhung type, produced a bulky and relatively complicated transmission which could not be readily applied to all types of machines and installations.

It is therefore a primary object of the present invention to provide an improved power transmission of the overhung type, which is extremely durable and compact in construction, and wherein the main bearing of the motion transmitting shaft is amply protected against wear due to the application of excessive lateral pressure against the driving member.

Another object of this invention is to provide a simple and strong rotary motion transmitting assemblage especially adapted for the transmission of heavy and variable loads, and which may be conveniently applied to a main frame or support in which the motion transfer shaft or element is journalled.

A further object of my invention is to provide an improved power or motion transmitting mechanism which may be readily assembled or dismantled from relatively simple and durable parts all of which are easily accessible for inspection and which may also be properly lubricated.

Still another object of the invention is to provide an improved overhung type of power transmission wherein the rotary motion transmitting shaft is well protected against excessive bending and torque stresses, and in which friction losses are reduced to a minimum.

An additional object of this invention is to provide a highly efficient overhung rotary motion transmitter adapted for diverse uses, and wherein all elements are amply protected against rapid wear and possible damage due to abnormal loading thereof.

These and other objects and advantages will be apparent from the following detailed description of several different embodiments of the invention.

A clear conception of the several features constituting my present invention and of the mode of constructing and utilizing the improved power transmissions, may be had by referring to the drawing accompanying and forming a part of this specification wherein like reference characters designate the same or similar parts in the two views.

Fig. 1 is a central vertical longitudinal section through a typical power transmitter embodying the invention, and provided with a friction type of overload release mechanism; and Fig. 2 is a similar section taken through another typical transmitter also embodying the invention, but provided with a shear pin type of releasable connection.

While the present disclosure of the invention has been confined to only two specific types of releasable connectors between the driving member and the rotary motion transmitting shaft, it is not my desire or intent to unnecessarily restrict the scope or utility of the improvement by virtue of this limited showing since various other types of releasable connections may be employed.

Referring to the drawing, the improved power transmission illustrated in Figs. 1 and 2, comprises in general a rigid support or frame 5 having a main anti-friction bearing 6 mounted thereon and firmly secured thereto; a shaft 7 journalled for rotation in the bearing 6 and having an inwardly projecting end provided with a driven member or pinion 8, and also having an outwardly projecting elongated end portion 9 extending away from the frame 5; a rigid sleeve 10 surrounding the shaft portion 9 and being firmly secured at one end to the main frame 6; an annular anti-friction bearing 11 embracing the sleeve 10; a driving member or pulley 12 journalled for rotation on the annular bearing 11; and a rotary motion transmitting connection reaching around the opposite free end of the sleeve 10 remote from the frame 5 and drivingly connecting the shaft portion 9 with the pulley 12.

The sturdy main frame 5 may be part of various types of machines or installations with which the power transmitting mechanism is to be associated; and the main anti-friction bearing 6 is of the end-thrust resistant type consisting of several spaced annular sets of bearing rollers 14, 15 coacting with an intervening collar 16 secured to the shaft 7 and with a bushing 17 snugly fitting a bore of the frame 5. As shown, the driven member or bevel pinion 8 is formed integral with the inner end of the transmission shaft 7 and meshes with a bevel gear 18 secured to a driven shaft 19 also journalled for rotation in one or more bearings 20 carried by the main frame 5; but the driven member to which rotary motion or power is delivered by the shaft 7, may assume diverse forms.

The rigid sleeve 10 within which the overhanging end portion 9 of the transmission shaft 7 is centrally disposed, is firmly but detachably secured to the frame 5 by means of studs and nuts 21 which also clampingly coact with an integral flange 22 to hold the main bearing bushing 17 in place; and a centering collar 24 removably secured to the shaft end portion 9 by means of a key 25, may be interposed between the overhanging shaft end and the internal bore of the sleeve 10. The annular anti-friction bearing 11 is of the ball type and is interposed between the medial external portion of the fixed sleeve 10 and the interior of the supporting hub 26 of the driving member or pulley 12, so that this driving member is in fact overhung with respect to its supporting frame 5.

The rotary motion transmitting connection which reaches or extends around the outer free end of the fixed supporting sleeve 10, is preferably of a releasable type adapted to either slip or break under excessive overload conditions, so as to protect the various parts against possible destruction. As specifically shown in Fig. 1, the releasable slip connection consists primarily of a flat disk 27 secured to the outer extremity of the shaft collar 24 by means of several keys 28, and having annular friction rings 29, 30 secured to the opposite sides of its peripheral portion; an annular driving element 31 secured to the driving member hub 26 by means of studs and nuts 32 and frictionally engaging the ring 29; another annular driving element 34 frictionally engaging the other ring 30; an annular reaction ring 35 secured to and suspended from the driving disk 27 by means of rods 36 and adjustable nuts 37; and a helical compression spring 38 embracing each of the rods 36, these springs having their inner ends in direct contact with the element 34 while their outer ends react against the ring 35.

The collar 24, disk 27, and key 28 may be locked against longitudinal displacement relative to the shaft 7 and relative to each other, with the aid of an end plate 39, cap screw 40, and a wire retainer 41 as shown in Fig. 1, and the tension of the springs 38 may be readily varied by adjusting the nuts 37 so as to increase or diminish the clamping pressure applied to the rings 29, 30 and disk 27 by the elements 31, 34. With this assemblage of elements it will be apparent that rotary motion applied to the driving pulley 12 will normally be transmitted through the elements 31, 34 to the friction rings 29, 30 and disk 27, and from the disk 27 through the collar 24 to the transmission shaft 7 outwardly beyond and around the outer end of the fixed sleeve 10. However, if the load thus normally transmitted becomes excessive or abnormal for any reason, the motion transmission will be partially released by slippage between the rings 29, 30 and the adjacent elements 31, 34 respectively, thus relieving the parts of undue stresses and obviating damage thereof.

In the modification specifically illustrated in Fig. 2, the shaft embracing collar 24' is provided with an integral flange 42 at its outer end, and this flange is disposed laterally adjacent to a flange 44 formed integral with an annular driving element 45 secured to the driving pulley hub 26 by cap screws 46. The two adjacent flanges 42, 44 are provided with one or more sets of alined openings within which shear pins 47 are normally confined, and a clamping plate 39, cap screw 40, and wire 41 may again be utilized to prevent longitudinal displacement of the collar 24' and its flange 42 relative to the transmission shaft 7. With the modified assemblage of elements, rotary motion applied to the pulley 12 will normally be transmitted through the element 45 and pins 47 to the collar 24' and shaft 7, outwardly beyond the fixed sleeve 10; but under excessive loading, the pins 47 will be sheared off, thus providing a releasable driving connection which may be readily restored by merely inserting new shear pins 47.

In both embodiments of the invention shown and described herein, the principal parts of the motion transmitting mechanism are the same, and the primary difference lies in the construction of the releasable driving connection between the driving member 12 and the shaft 7. In each case, the driving member or pulley 12 is mounted for rotation upon a sturdy fixed sleeve 10 firmly secured directly to the main frame 5, so that the transmission shaft 7 is entirely relieved of lateral pressures tending to bend the same and to thus produce undue wear in the bearings 14, 15. The releasable driving connection in each type of drive shown, uniformly transmits the torque load from the driver to the driven member around the free end of the sleeve 10 thereby also obviating excessive stresses; and while the embodiment of Fig. 1 automatically relieves the mechanism of abnormal stress due to such over-loading, the shear pins 47 of Fig. 2 afford an efficient releasable driving connection which may be conveniently renewed and which is somewhat simpler in construction.

From the foregoing detailed description it will be apparent that my present invention provides an improved power transmission which is extremely simple and compact in construction, and wherein the various parts are well protected against excessive wear and possible damage. The improved mechanism is highly flexible in its adaptations and may be utilized for diverse purposes, and all elements of the assemblage may be readily manufactured, assembled and dismantled, and may also be abundantly lubricated during normal operation. By utilizing anti-friction bearings 11, 14, 15 in the transmission, friction losses are minimized; and by mounting the bearings 14, 15 in a bushing 17 normally secured to the main frame 5 by means of the same fastenings which are used to attach the sleeve 10 to the frame, the entire transmission unit may be applied or removed by merely manipulating the clamping nuts 21. The collar 16 and plate 39 cooperate to positively prevent axial displacement of the shaft 7 and associated parts, and by locating the releasable connections at the free end of the fixed supporting sleeve 10 the elements of these connections are conveniently accessible at all times for adjustment or renewal. The driving member 12 may be either a pulley or any other device adapted to impart rotary motion directly to the releasable connection, while revolving about the stationary sleeve 10; and any other type of releasable connection may also be substituted for those specifically illustrated without departing from the spirit of the invention.

It should be understood that it is not my desire to limit the present invention to the exact details of construction or to the precise mode of operation and use, herein shown and described, for various modifications within the scope of the appended claims may occur to persons skilled in the art; and it is also contemplated that specific descriptive terms employed herein be given the broadest interpretation consistent with the disclosures.

I claim:

1. In a power transmission the combination of a frame, a shaft projecting therefrom, a bearing seated in said frame and in which said shaft is journalled, a set of of coacting gears in said frame including a gear on said shaft, a sleeve surrounding the projecting end of said shaft and radially spaced therefrom, means for rigidly securing said sleeve to said frame with the inner end thereof positioned to retain said bearing against axial displacement, a rotor journalled on said sleeve, and a torque-limiting driving connection between said rotor and shaft.

2. In a power transmission the combination of a frame, a shaft journalled therein and projecting therefrom, a set of coacting gears in said frame including a gear on said shaft, a sleeve surrounding the projecting end of said shaft and radially spaced therefrom, a mounting flange at the inner end of said sleeve by which the latter is rigidly secured to said frame in concentric relation to said shaft, a rotor carried by said sleeve, and a torque-limiting driving connection between said rotor and shaft, said connection comprising a pair of disks respectively fixed to said shaft and rotor and a load responsive yieldable connection between said disks.

WALTER P. SCHMITTER.

REFERENCES CITED

The following references are of record in the file of this patent:

UNITED STATES PATENTS

| Number | Name | Date |
|---|---|---|
| 2,087,726 | Bath | July 20, 1937 |
| 2,287,391 | Musselman | June 23, 1942 |

FOREIGN PATENTS

| Number | Country | Date |
|---|---|---|
| 381,403 | Great Britain | 1932 |
| 428,179 | Great Britain | 1935 |